United States Patent
Contractor et al.

(10) Patent No.: US 10,083,230 B2
(45) Date of Patent: Sep. 25, 2018

(54) CLUSTERING A COLLECTION USING AN INVERTED INDEX OF FEATURES

(75) Inventors: Danish Contractor, Gurgaon (IN); Thomas Hampp-Bahnmueller, Stuttgart-Vaihingen (DE); Sachindra Joshi, New Delhi (IN); Raghuram Krishnapuram, New Delhi (IN); Kenney Ng, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 12/966,698

(22) Filed: Dec. 13, 2010

(65) Prior Publication Data

US 2012/0150867 A1 Jun. 14, 2012

(51) Int. Cl.
*G06F 7/00* (2006.01)
*G06F 17/30* (2006.01)

(52) U.S. Cl.
CPC .... *G06F 17/3071* (2013.01); *G06F 17/30598* (2013.01); *G06F 17/30622* (2013.01)

(58) Field of Classification Search
CPC .......... G06F 17/3002; G06F 17/30097; G06F 17/30321; G06F 17/30613; G06F 17/30616; G06F 17/30619; G06F 17/30632; G06F 17/30946; G06F 17/30598; G06F 17/30705; G06F 17/3071
USPC ....... 707/696, 706, 708, 711, 713, 741, 742, 707/737–739, 748–752
See application file for complete search history.

(56) References Cited

U.S. PATENT DOCUMENTS

| | | | |
|---|---|---|---|
| 6,363,379 B1 | 3/2002 | Jacobson et al. | |
| 7,634,469 B2 | 12/2009 | Lee et al. | |
| 2003/0018629 A1* | 1/2003 | Namba | 707/3 |
| 2004/0172378 A1* | 9/2004 | Shanahan | G06F 17/30702 |
| 2006/0026152 A1* | 2/2006 | Zeng et al. | 707/5 |
| 2007/0112867 A1 | 5/2007 | Evans et al. | |
| 2007/0143235 A1* | 6/2007 | Kummamuru et al. | 706/15 |
| 2009/0313228 A1 | 12/2009 | Grandhi et al. | |
| 2010/0287160 A1* | 11/2010 | Pendar | G06F 17/30705 707/737 |

(Continued)

FOREIGN PATENT DOCUMENTS

| | | |
|---|---|---|
| EP | 1191459 A1 | 3/2002 |
| JP | 2002109536 | 4/2002 |

OTHER PUBLICATIONS

English Abstract & Machine Translation for JP2002109536A, published Apr. 12, 2002, Total 32 pp.

(Continued)

*Primary Examiner* — Jason G Liao
*Assistant Examiner* — Berhanu Mitiku
(74) *Attorney, Agent, or Firm* — Janaki K. Davda; Konrad, Raynes, Davda & Victor LLP

(57) ABSTRACT

Provided are techniques for creating an inverted index for features of a set of data elements, wherein each of the data elements is represented by a vector of features, wherein the inverted index, when queried with a feature, outputs one or more data elements containing the feature. The features of the set of data elements are ranked. For each feature in the ranked list, the inverted index is queried for data elements having the feature and not having any previously selected feature and a cluster of the data elements is created based on results returned in response to the query.

12 Claims, 10 Drawing Sheets

(56) References Cited

U.S. PATENT DOCUMENTS

2011/0004588 A1* 1/2011 Leitersdorf et al. .......... 707/711
2012/0016877 A1* 1/2012 Vadrevu ............ G06F 17/30696
　　　　　　　　　　　　　　　　　　　　　　　　　707/737

OTHER PUBLICATIONS

Jo, T., "Inverted Index based Modified Version of K-Means Algorithm for Text Clustering", Journal of Information Processing Systems, vol. 4, No. 2, Jun. 2008, © 2008 KIPS, Total 10 pp.
Liu, X., Z. Du., Y. Chen, and M. Dai, "An Index Clustering and Mapping Algorithm for Large Scale Astronomical Data Searching", 29th IEEE International Conference on Distributed Computing Systems Workshops, © 2009 IEEE, Total 6 pp.
Voorhees, E.M., "The Efficiency of Inverted Index and Cluster Searches", Proceedings of the 9th Annual International ACM SIGIR Conference on Research and Development in Information Retrieval, © 1986, Total 11 pp.
Willett, P., "Document Clustering Using an Inverted File Approach", Journal of Information Science, 1980, Total 10 pp.
Jain, A.K., M.N. Murty, and P.J. Flynn, "Data Clustering: A Review", ACM Computing Surveys, vol. 31, No. 3, Sep. 1999, Total 60 pp.
Navarro, G., "Chapter 8: Indexing and Searching", Jan. 1999, Modern Information Retrieval, ACM Press, Total 38 pp.
PCT International Search Report and Written Opinion, dated Mar. 22, 2012, for International Application No. PCT/EP2011/072195, Total 9 pp.

* cited by examiner

CLUSTERING A COLLECTION USING AN INVERTED INDEX OF FEATURES

BACKGROUND

1. Field

Embodiments of the invention relate to clustering a document collection using an inverted index storing features.

2. Description of the Related Art

Clustering may be described as assignment of a set of observations into subsets. Observations in the same set are similar in some sense. Clustering may be performed bottom-up or top-down. With bottom-up clustering, each document in a set of documents is placed in one cluster, and then two or more clusters are combined to form clusters with multiple documents. With top-down clustering, the documents in the set of documents are all placed into one cluster. Then, this cluster is broken up into smaller clusters, each having one or more documents.

There are several different kinds of distance measures that may be used to determine how similar two documents are to determine whether they should be placed into a same cluster. The following are examples of distance measures: Euclidean, Manhattan, Mahalanobis, etc.

K-means clustering may be described as cluster analysis that attempts to partition n observations into k clusters in which each observation belongs to the cluster with the nearest mean. Hierarchical agglomerative clustering may be described as merging of clusters based on their proximity to each other.

Conventional clustering techniques are complex. Conventional clustering typically involves comparing every pair in the collection. This takes at least $O(n^2)$ time to complete. Even for single pass algorithms, such as leader clustering, the worst case takes $O(n^2)$ time to complete. Thus, it is difficult to perform clustering for hundreds of thousands or even million of documents in a reasonable amount of time. Even linear time clustering techniques can take an unreasonable amount of time to complete.

Clustering is typically unsupervised. That is, the document clustering/grouping is performed without using any guidance/supervision (e.g., without some example documents that have been labeled with accurate group/cluster memberships). Another issue with clustering is generating a good description of the clusters (i.e., clearly describing what similarities put the documents into the same cluster).

Thus, there is a need for an improved clustering technique.

BRIEF SUMMARY

Provided are a method, computer program product, and system for creating an inverted index for features of a set of data elements, wherein each of the data elements is represented by a vector of features, wherein the inverted index, when queried with a feature, outputs one or more data elements containing the feature. The features of the set of data elements are ranked. For each feature in the ranked list, the inverted index is queried for data elements having the feature and not having any previously selected feature and a cluster of the data elements is created based on results returned in response to the query.

BRIEF DESCRIPTION OF THE SEVERAL VIEWS OF THE DRAWINGS

Referring now to the drawings in which like reference numbers represent corresponding parts throughout:

FIG. 4 is formed by FIGS. 4A and 4B.

FIG. 5 is formed by FIGS. 5A and 5B.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
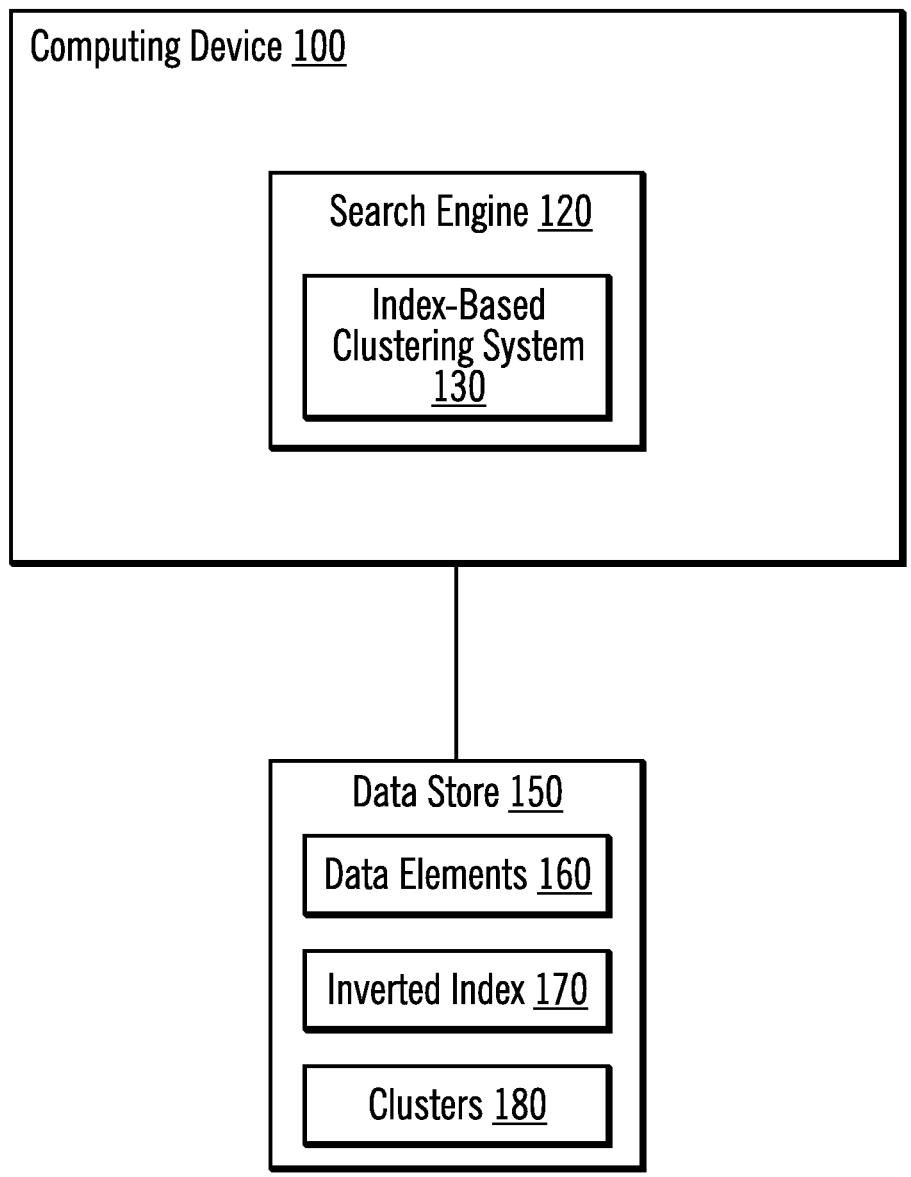
FIG. 1 illustrates, in a block diagram, a computing architecture in accordance with certain embodiments.

FIG. 1 illustrates, in a block diagram, a computing architecture in accordance with certain embodiments. A computing device 100 is coupled to a data store 150. In certain embodiments, the computing device 100 is a server computer, and the data store 150 is a database. The computing device 100 includes a search engine 120. The search engine 120 includes an index-based clustering system 130.

The data store 150 includes data elements 160 (e.g., documents), an inverted index 170, and clusters 180. In certain embodiments, one or more of the clusters 180 are sub-clusters. In certain embodiments, one or more clusters 180 may be computed on the fly by the index-based clustering systems 139. In certain embodiments, one or more clusters 180 may be pre-computed in the data store 150. A data element 160 includes one or more words and has one or more features. Features may be, for example, bi-grams or noun phrases of different lengths (e.g., noun phrase of length 2 (NP2), noun phrase of length 3 (NP3), noun phrase of length 4 (NP4), etc.). The features act as labels for the clusters. The data elements 160 in a cluster 180 have the feature that is used as the label for the cluster 180.

The index-based clustering system 130 provides:
Document collection coverage (i.e., all data elements 160 in a given set are placed into at least one cluster).
Sibling node distinctiveness (each cluster 180 is different from another).
Node label description (each cluster 180 is labeled).
Node label predictiveness (the label of a cluster 180 suggests the content of the cluster).

The index-based clustering system 130 may be polythetic or monothetic. Polythetic may be described as assigning a data element 160 to a cluster 180 based on multiple features. Monothetic may be described as assigning a data element 160 to a cluster 180 based on a single feature.

Figure 2:
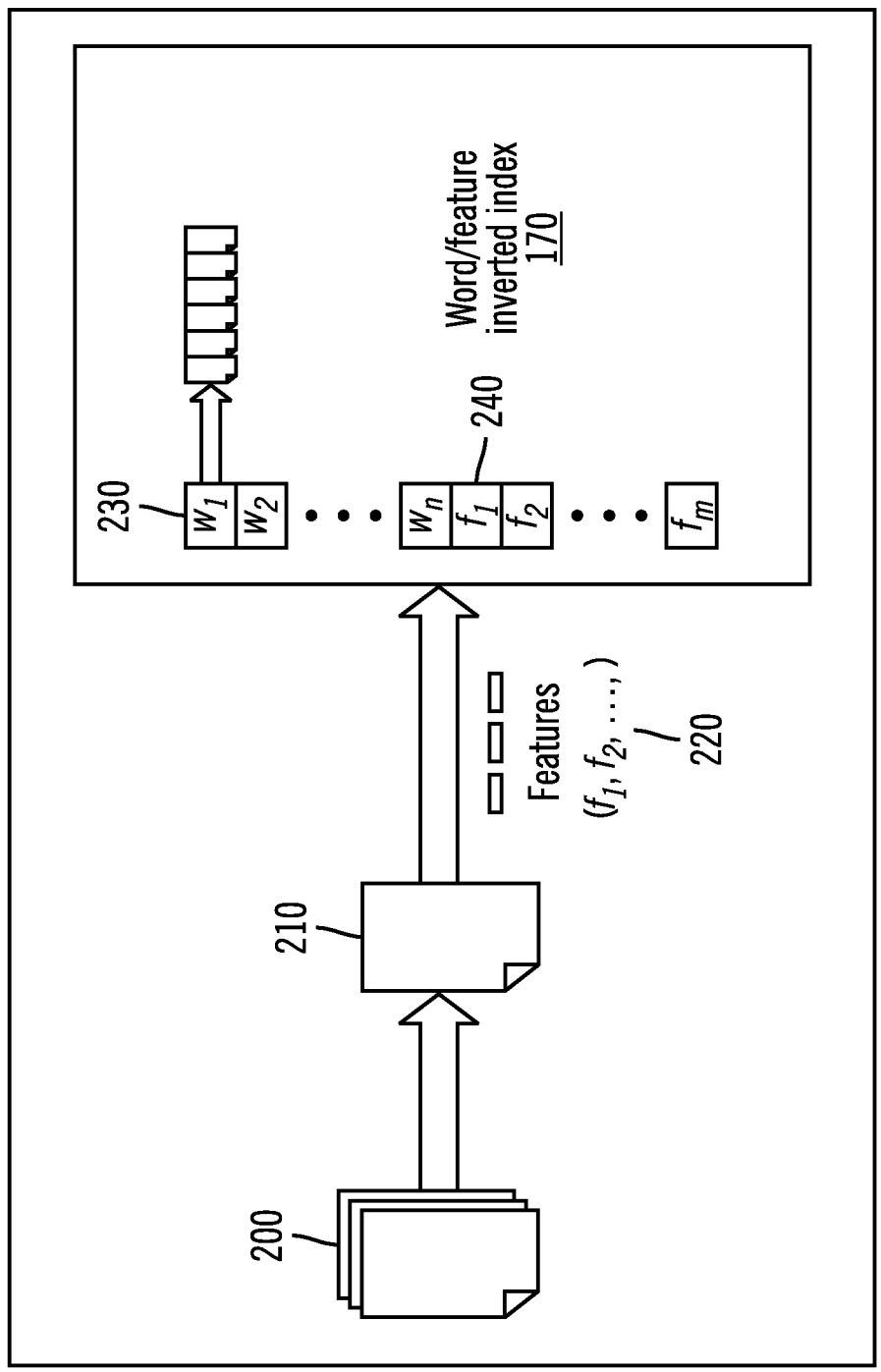
FIG. 2 illustrates, in a block diagram, creation of an inverted index in accordance with certain embodiments.

FIG. 2 illustrates, in a block diagram, creation of an inverted index 170 in accordance with certain embodiments. Starting with a set of data elements 200 (e.g., a document collection), each data element is selected. For example, data element 210 is selected. The index-based clustering system 130 takes the data element 210 and computes a set of features 220 from the data element 210. Example features 220 include noun phrases, named entities, and n-grams. Then, the words and features of that data element 210 are used to populate a word/feature inverted index 170. The inverted index 170 includes a list of words 230 ($w_1$, $w_2$, ... $w_n$) and a list of features 240 ($f_1$, $f_2$, ... $f_m$). For each word, the inverted index 170 identifies the data elements 200 in which that word appears. For each feature 240, the inverted index 170 identifies the data elements 200 having that feature 240. In certain embodiments, there is a posting list for each word 230 and for each feature 240 in the inverted index 170. In certain embodiments, the posting list for each word 230 includes a word, documents in which that word occurs, and a count of the number of times the word occurs in each document. In certain embodiments, the posting list for each feature 240 includes a phrase, documents in which that phrase occurs, and a count of the number of times the phrase occurs in each document.

Figure 3:
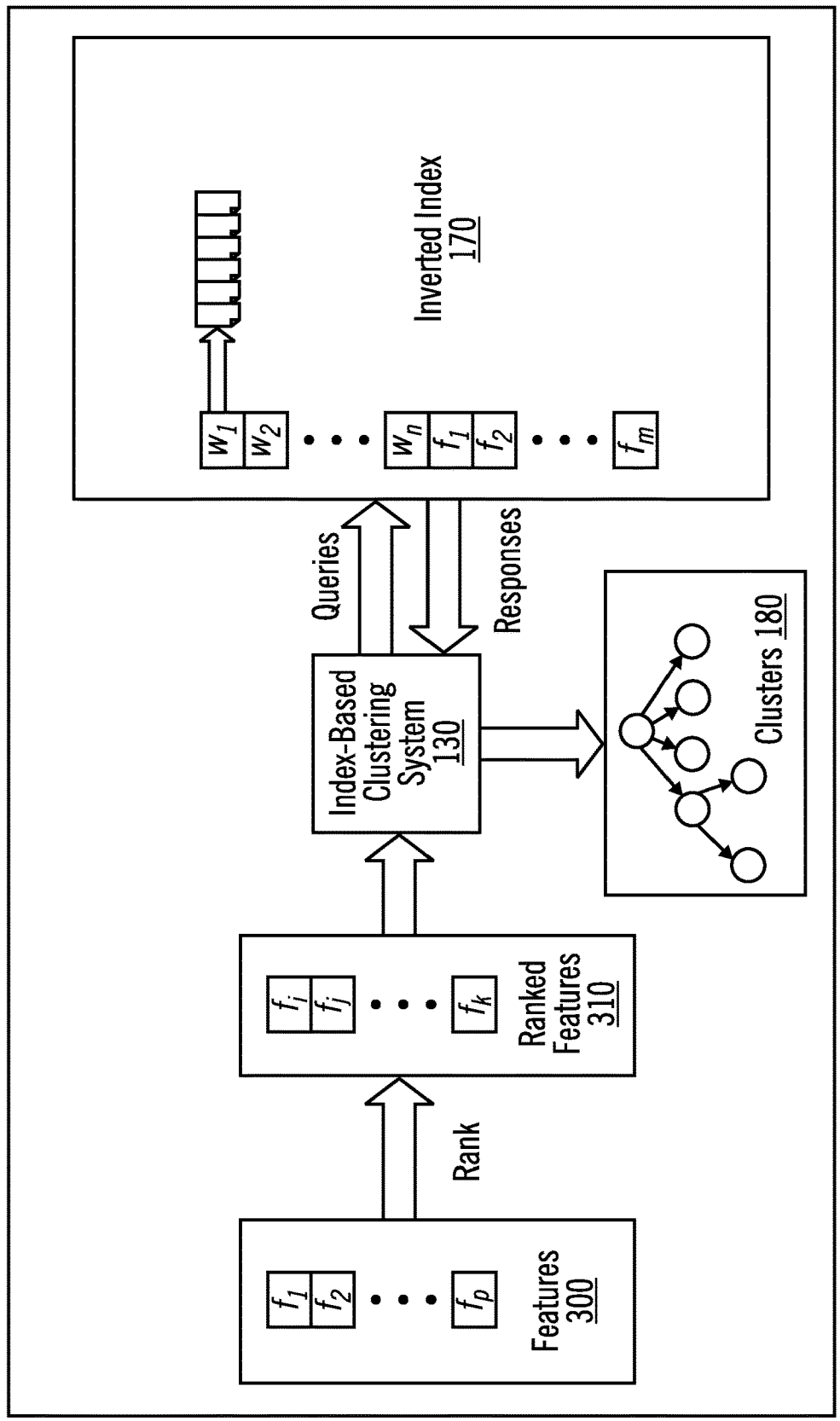
FIG. 3 illustrates, in a block diagram, index-based clustering in accordance with certain embodiments.

FIG. 3 illustrates, in a block diagram, index-based clustering in accordance with certain embodiments. Initially, the index-based clustering system 130 ranks features 300 to form ranked features 310. In various embodiments, different ranking techniques may be used for different use cases. Some example ranking techniques include, for example, the frequency of occurrence of the features across the document collection or a weight computed for each feature. The index-based clustering system 130 issues queries to the inverted index 170 regarding the ranked features 310 and receives responses with identifiers of the data elements that match the query from the inverted index 170. The index-based clustering system 130 uses the responses to form clusters 180.

Figure 4A:
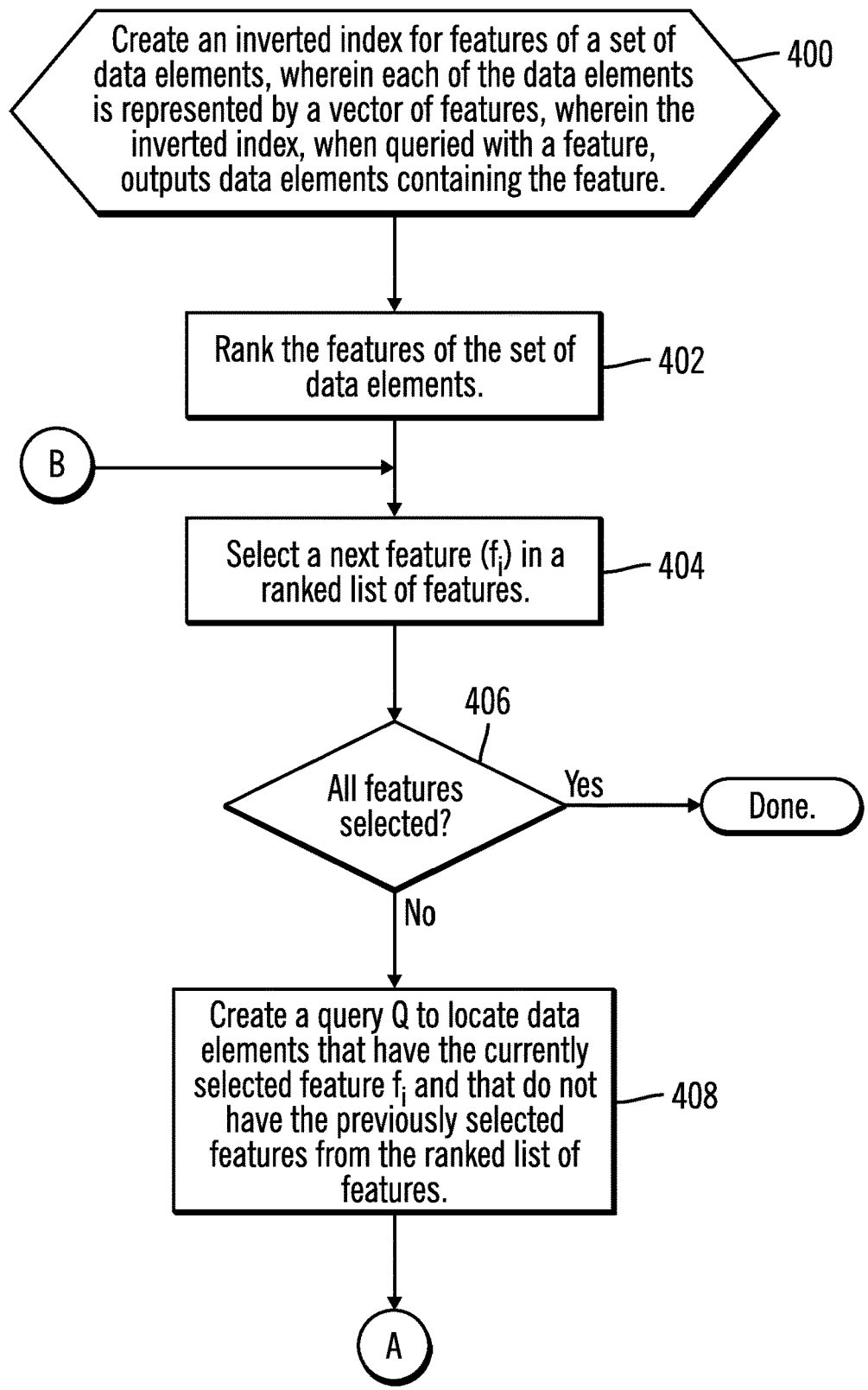
FIG. 4 illustrates, in a flow diagram, processing performed by an index-based clustering system in accordance with certain embodiments.
Figure 4B:
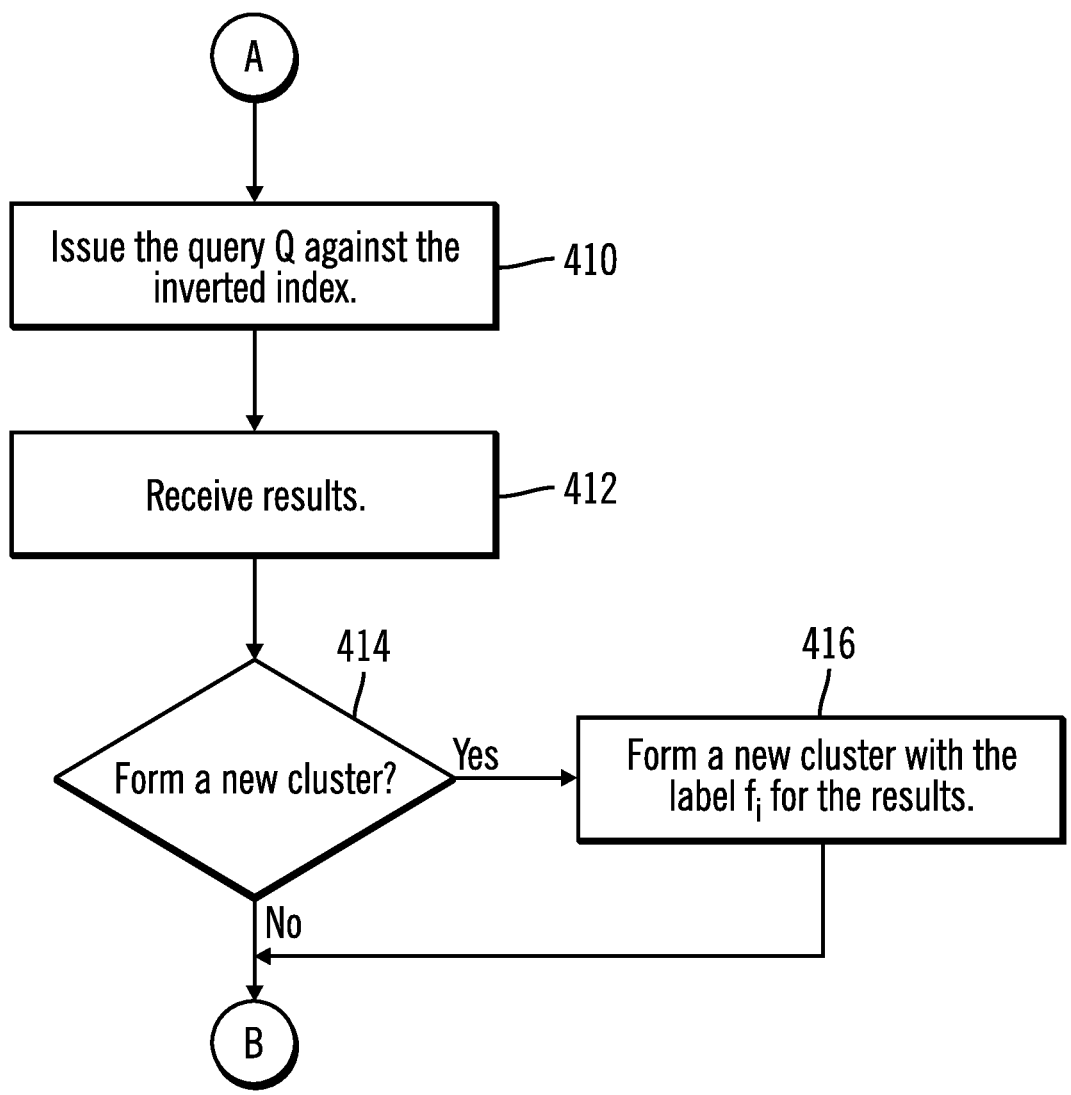

FIG. 4 illustrates, in a flow diagram, processing performed by the index-based clustering system 130 in accordance with certain embodiments. FIG. 4 is formed by FIGS. 4A and 4B. Control begins in block 400 with the index-based clustering system 130 creating an inverted index 170 for features of a set of data elements, wherein each of the data elements is represented by a vector of features. When the inverted index 170 is queried with a feature, the data elements 160 containing the feature are output. The inverted index 170 may include words in addition to the features.

In block 402, the index-based clustering system 130 ranks the features of the set of data elements.

In block 404, the index-based clustering system 130 selects a feature $f_i$ from a ranked list of features. In block 406, the index-based clustering system 130 determines whether all features have already been selected. If so, processing is done, otherwise, processing continues to block 408. In certain embodiments, in block 406, the index-based clustering system 130 determines whether all the data elements 160 have been clustered. If so, the processing is done, otherwise, processing continues to block 408. In block 408, the index-based clustering system 130 creates a query Q to locate data elements 160 that have the currently selected feature $f_i$ and that do not have the previously selected features from the ranked list of features (that were already used to form clusters $C_1$, $C_2$, ... $C_m$). One example of the query takes the form Q=($f_i$ AND !$C_1$ AND !$C_2$ ... AND !$C_m$), where $C_1$, $C_2$, ... $C_m$ represent clusters formed from previously selected features. That is, the query looks for data elements 160 having feature $f_i$ and not having any previously selected features from the ranked list of features. From block 408 (FIG. 4A), processing continues to block 410 (FIG. 4B).

In block 410, the index-based clustering system 130 issues the query Q against the inverted index 170. In block 412, the index-based clustering system 130 receives results. In block 414, the index-based clustering system 130 determines whether to form a new cluster. If so, processing continues to block 416, otherwise, processing loops back to block 404 to select the next feature. In block 416, the index-based clustering system 130 forms a new cluster 180 with the label $f_i$ for the results. From block 416, processing loops back to block 404 to select the next feature.

In certain embodiments, the index-based clustering system 130 determines whether to form a new cluster 180 based on whether the number of results is greater than a threshold. However, in various embodiments, other conditions may be used to determine whether to form a cluster. Also, in certain embodiments, there is no condition (i.e., each set of results is used to form a new cluster 180).

The threshold may be set, for example, by a system administrator based on one or more factors. Some example of factors include: a total number of desired clusters, a minimum size of each cluster, an amount of processing time available (i.e., more clusters will take more time). In certain embodiments, there may be dependencies on the specific data elements and the application so some empirical testing and tuning may be used to determine the threshold.

Figure 5A:
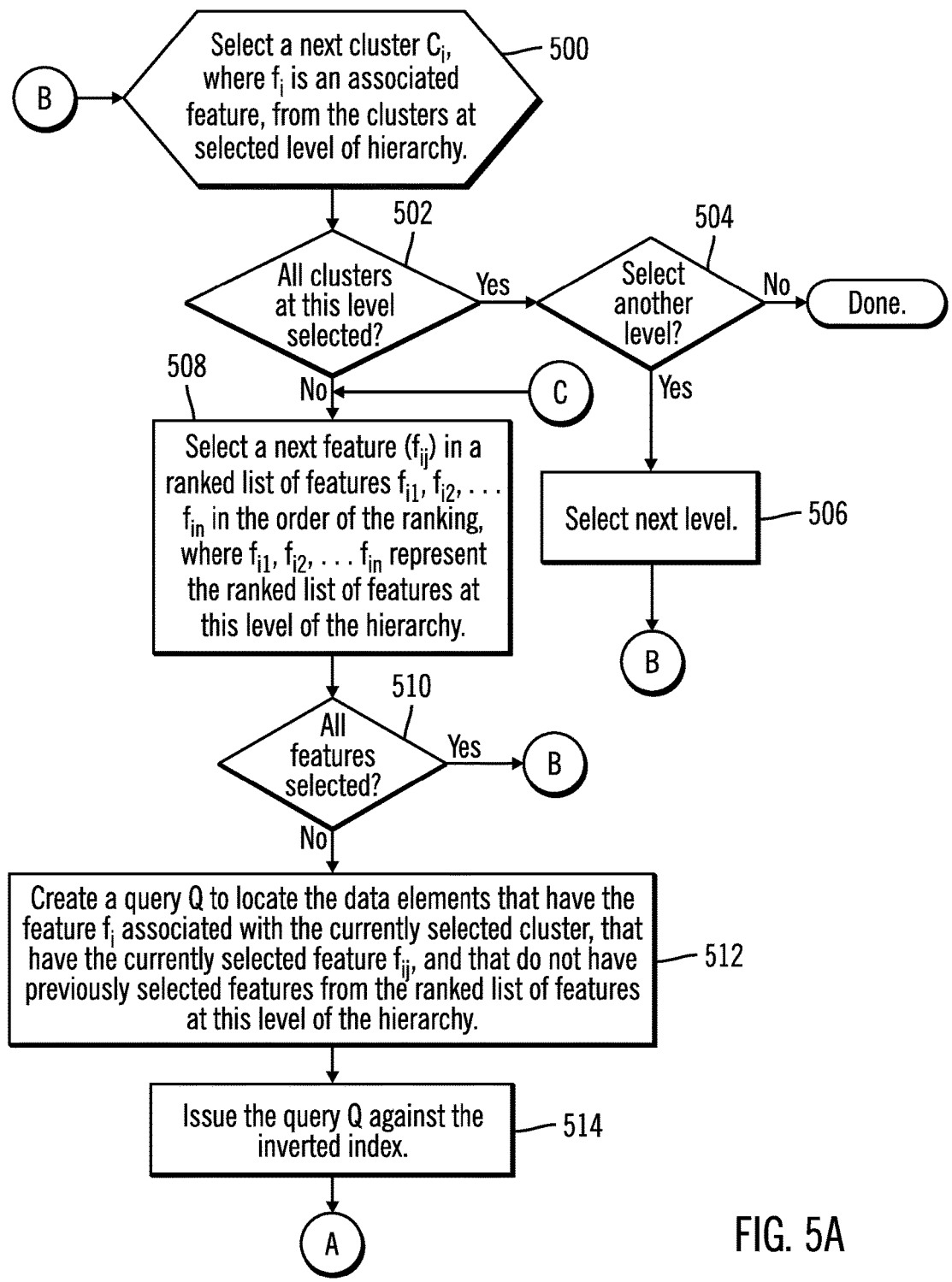
FIG. 5 illustrates, in a flow diagram, processing performed by an index-based clustering system for generating a hierarchy of clusters in accordance with certain embodiments.
Figure 5B:
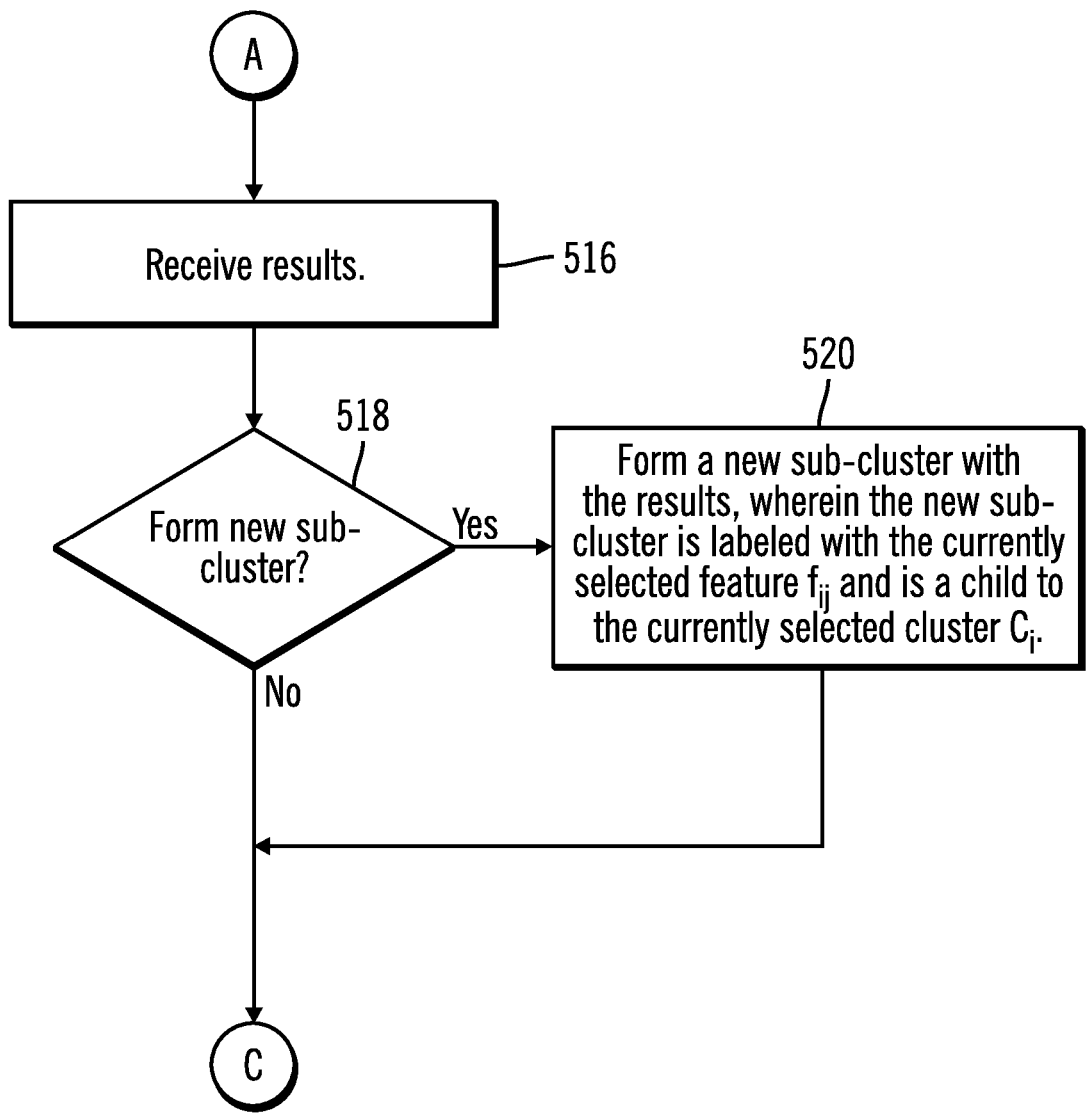

FIG. 5 illustrates, in a flow diagram, processing performed by the index-based clustering system 130 for generating a hierarchy of clusters in accordance with certain embodiments. FIG. 5 is formed by FIGS. 5A and 5B. For FIG. 5, let $C_1$, $C_2$, ... $C_m$ be the clusters determined at a selected level of the hierarchy. Control begins at block 500 with the index-based clustering system 130 selecting a next cluster $C_i$, where $f_i$ is the associated feature, from the clusters $C_1$, $C_2$, ... $C_m$ at the selected level of the hierarchy. In block 502, the index-based clustering system 130 determines whether all clusters at the selected level of the hierarchy have been selected. If so, processing continues to block 504, otherwise, processing continues to block 508.

In block 504, the index-based clustering system 130 determines whether to select another level of the hierarchy for processing. If so, processing continues to block 506, otherwise, processing is done. The index-based clustering system 130 may determine whether to select another level of the hierarchy based on one or more factors, such as: configuration (e.g., system is configured to create two-level deep cluster hierarchies) or a threshold based on a number of documents in the current cluster (e.g., if the cluster has more than N documents, it is determined to create finer grained sub-clusters).

In block 506, the index-based clustering system 130 selects a next level of the hierarchy. From block 506, processing loops back to block 500.

For example, the index-based clustering system 130 may move to a lower level of the hierarchy before repeating the processing described in FIG. 5. For example, the index-based clustering system 130 starts at level 1 and creates clusters $C_1$, $C_2$, $C_3$, ... $C_n$ from the entire set of data elements 160 as described with reference to FIG. 4. Next, the index-based clustering system 130 moves to level 2 by selecting the data elements in $C_1$ and then does the processing described in FIG. 5 to generate sub-clusters $C_{11}$, $C_{12}$, $C_{13}$, ... $C_{1m}$. The index-based clustering system 130 loops over all the level 1 clusters $C_1$, $C_2$, $C_3$, ... $C_n$ until done with this level. Then, if desired, for a level 3 clustering, the index-based clustering system 130 iterates over all the level 2 clusters: $C_{11}$, $C_{12}$, ..., $C_{1m}$, $C_{21}$, $C_{22}$, ..., $C_{31}$, $C_{32}$, ..., $C_{n1}$, $C_{n2}$, ... and perform the processing in FIG. 5. That is, processing is either done or the next level down in the hierarchy is selected for generating additional sub-clusters for the clusters that were generated. Thus, the processing of FIG. 5 may be repeated for different levels of the hierarchy.

In block 508, the index-based clustering system 130 selects a next feature ($f_{ij}$) in a ranked list of features $f_{i1}$, $f_{i2}$, ... $f_{in}$ in the order of the ranking, where $f_{i1}$, $f_{i2}$, ... $f_{in}$ represent the ranked list of features at this level of the hierarchy. In block 510, the index-based clustering system 130 determines whether all features have been selected from the ranked list of features. If so, processing loops to block 500 to select the next cluster, otherwise, processing continues to block 512.

In block 512, the index-based clustering system 130 creates a query Q to locate the data elements 160 that have the feature $f_i$ associated with the currently selected cluster, that have the currently selected feature $f_{ij}$, and that do not have previously selected features from the ranked list of features at this level of the hierarchy. One example of the query takes the form Q=($f_i$ AND !$f_{i1}$ AND !$f_{i2}$ ... AND !$f_{ij-1}$ AND $f_{ij}$), where $f_i$ is the feature associated with the currently selected cluster $C_i$, where $f_{i1}$, $f_{i2}$, ... $f_{ij-1}$ represent features that are associated with the already created sub-clusters of Ci (i.e., these are the previously selected features that have already been processed and used to create sub-clusters), and where $f_{ij}$ represents the currently selected feature. That is, the query looks for data elements having features $f_i$ and $f_{ij}$ and not having features $f_{i1}$, $f_{i2}$ ... and $f_{ij-1}$.

In block 514, the index-based clustering system 130 issues the query Q against the inverted index 170. From block 514 (FIG. 5A), processing continues to block 516 (FIG. 5B).

In block 516, the index-based clustering system 130 receives results. In block 518, the index-based clustering system 130 determines whether to form a new sub-cluster. If so, processing continues to block 520, otherwise, processing loops back to block 508 (FIG. 5A) to select the next feature.

In certain embodiments, the index-based clustering system 130 determines whether to form a new sub-cluster based on whether the number of results is greater than a threshold. However, in various embodiments, other conditions may be used to determine whether to form a new sub-cluster. Also, in certain embodiments, there is no condition (i.e., each set of results is used to form a new sub-cluster).

The threshold may be set, for example, by a system administrator based on one or more factors. Some example of factors include: a total number of desired sub-clusters, a minimum size of each sub-cluster, an amount of processing time available (i.e., more sub-clusters will take more time). In certain embodiments, there may be dependencies on the specific data elements and the application so some empirical testing and tuning may be used to determine the threshold.

In block 520, the index-based clustering system 130 forms a new sub-cluster with the results, wherein the new sub-cluster is labeled with a currently selected feature $f_{ij}$ and is a child to the currently selected cluster $C_i$. From block 520, processing loops back to block 508 to select the next feature.

Once the child relationships have been determined, the index-based clustering system 130 may use that information to form a hierarchy of the clusters.

The index-based clustering system 130 provides near real time clustering of hundreds of thousands of data elements 160. The index-based clustering system 130 provides rapid data analysis as the clustering technique can be run with different feature rankings and different parameter settings. An example of a parameter setting is overlap threshold, which controls how many documents from the currently proposed cluster can belong to an existing cluster and still allow the proposed cluster to be valid. The index-based clustering system 130 provides a fast clustering of the data elements in a set that may not fit in the memory of the computing device 100.

The index-based clustering system 130 has been tested on an email corpus that contains 500,000 (500K) documents. With the index-based clustering system 130, a clustering of the 500K documents is obtained in 2-3 sec. The data set cannot be clustered in-memory using the methods such as K-mean as the data is 500 MegaBytes (MB) on files.

Figure 6:
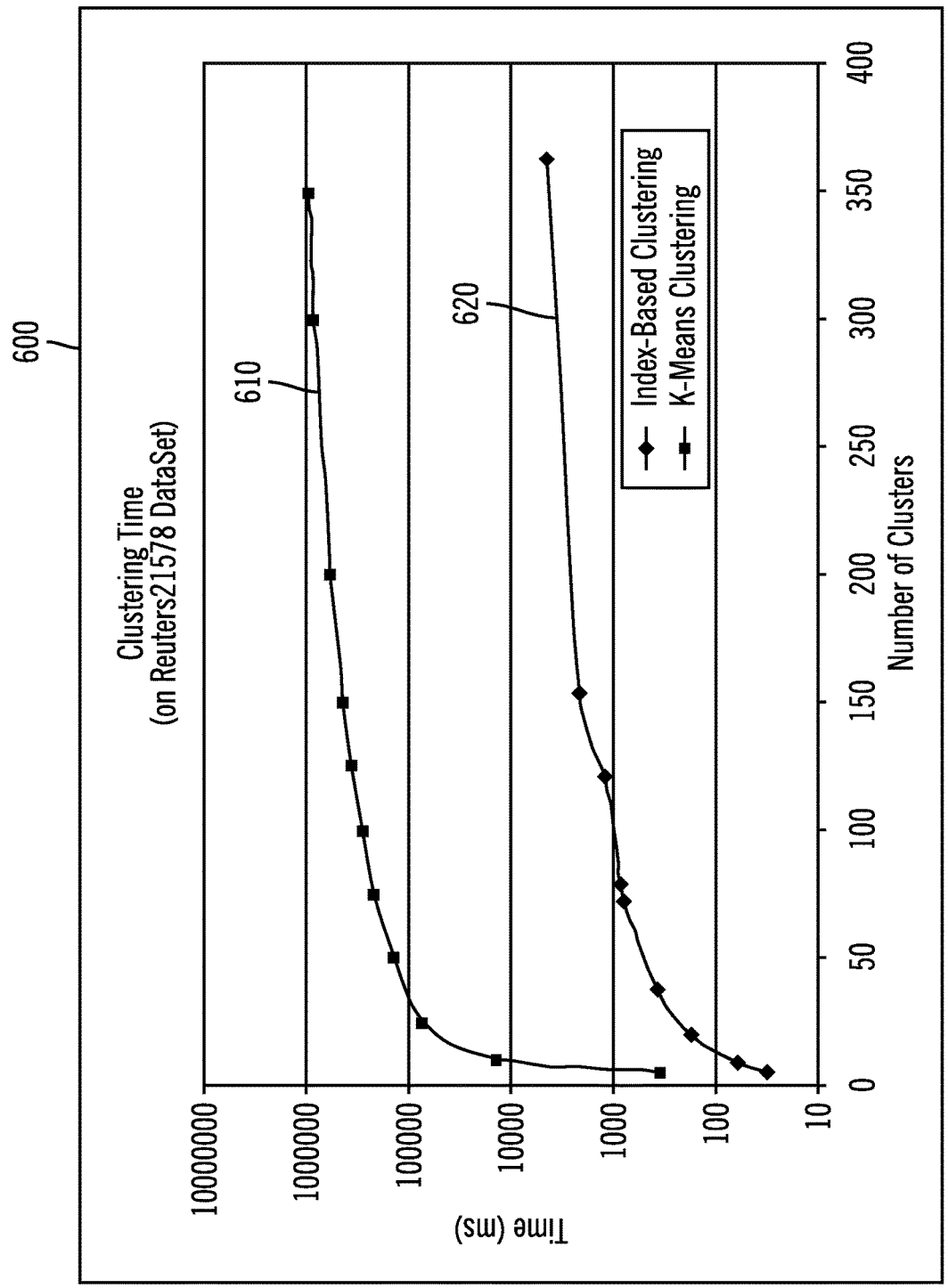
FIG. 6 illustrates, with a graph, clustering time comparison with a K-means approach in accordance with certain embodiments.

FIG. 6 illustrates, with a graph 600, clustering time comparison with a K-means approach in accordance with certain embodiments. In FIG. 6, line 610 represents K-means clustering and line 620 represents index-based clustering performed by the index-based clustering system 130.

Figure 7:
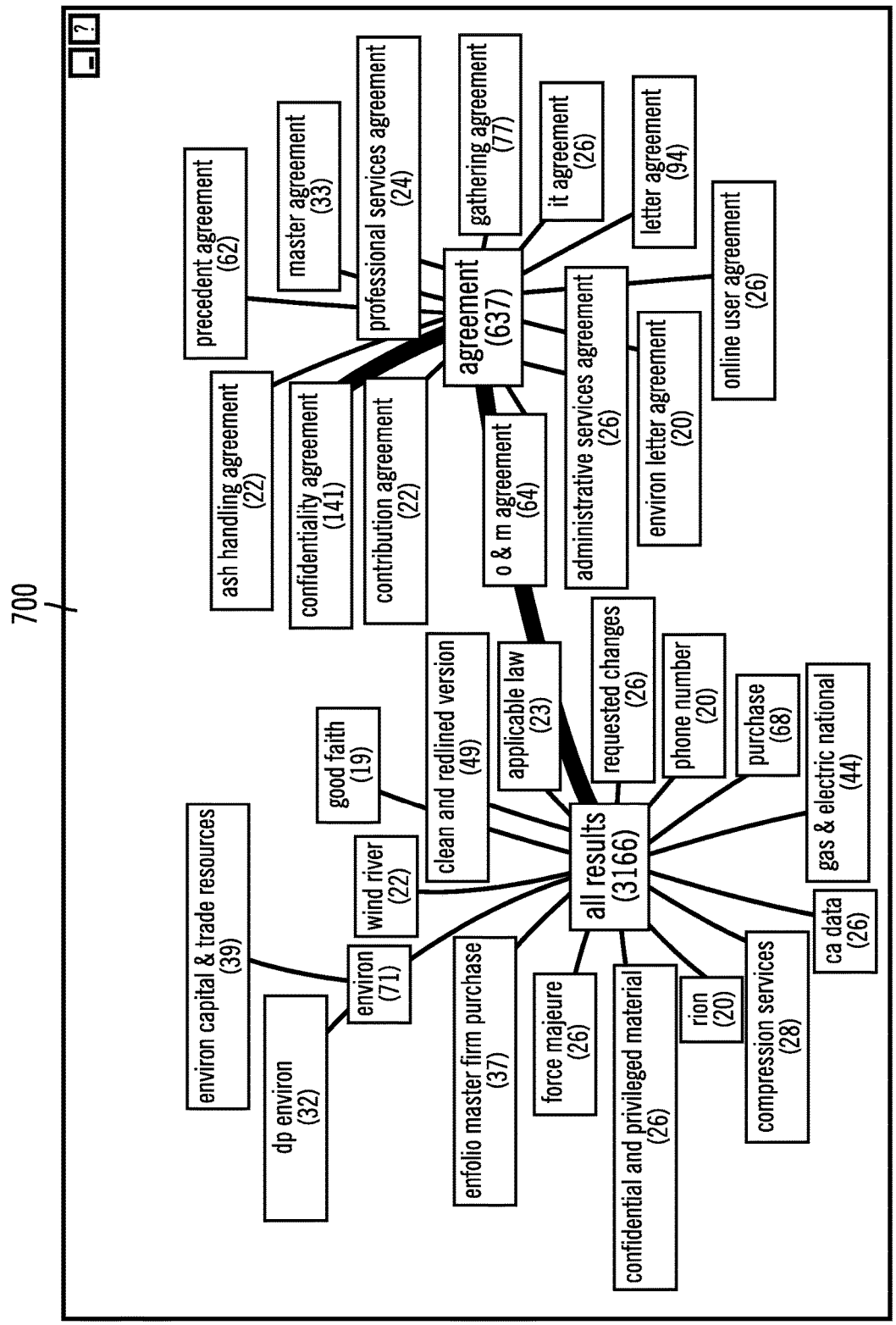
FIG. 7 illustrates, in a user interface, clusters identified by an index-based clustering system in accordance with certain embodiments

FIG. 7 illustrates, in a user interface 700, clusters identified by the index-based clustering system 130 in accordance with certain embodiments. The index-based clustering system 130 provides a navigable interactive user interface 700 to enable users to access the clusters.

In certain embodiments, a data collection (i.e., a set of data elements 160) is clustered, and each data element 160 is represented as a vector of features. The inverted index, when queried with one or more features, outputs data elements containing the one or more features.

With embodiments, the index-based clustering system 130 creates an inverted index 170 of the data collection. Given a feature, the index-based clustering system 130 uses the inverted index 170 to output the data elements 160 that contain that feature. The index-based clustering system 130 determines a list of features that is ranked in order of significance of each feature. For each feature in the ranked list, the index-based clustering system 130 queries the inverted index 170 and creates a cluster 180 based on the response obtained from the inverted index 170.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The index-based clustering system 130 may be implemented as hardware (e.g., hardware logic or circuitry), software, or a combination of hardware and software.

Figure 8:
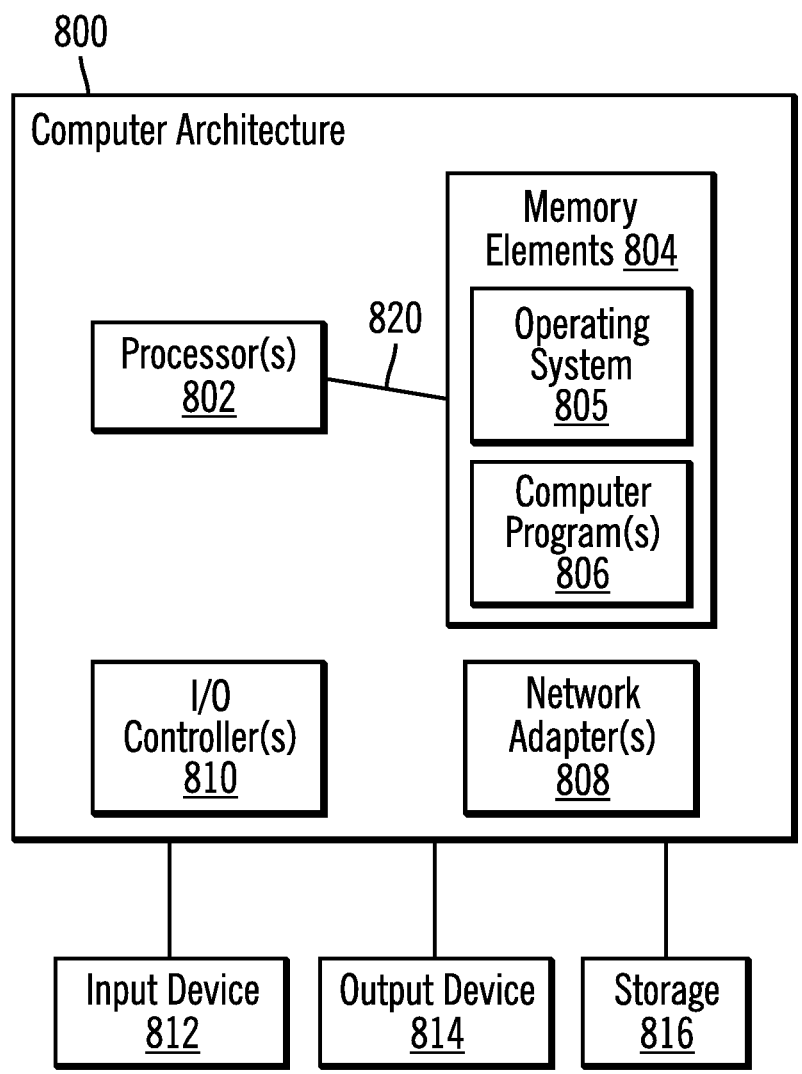
FIG. 8 illustrates, in a block diagram, a computer architecture that may be used in accordance with certain embodiments.

FIG. 8 illustrates a computer architecture 800 that may be used in accordance with certain embodiments. Computing device 100 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computer architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   storing, using a processor of a computer, data elements, wherein each of the data elements is represented by a vector of features from a set of features;
   creating an inverted index for the set of features;
   forming a ranked list of the features in the set of features; and
   creating clusters by performing for each of the features in the ranked list of the features:
      selecting a feature in the ranked list of the features that has not been previously selected to create the clusters;
      issuing a query against the inverted index to retrieve those data elements that have the selected feature and that do not have any of the features that were previously selected to create the clusters; and
      creating a new cluster of the retrieved data elements that have the selected feature and that do not have any of the features that were previously selected to create the clusters; and
   generating a hierarchy of the clusters by:
   for a cluster at a level of the hierarchy having a first feature,
      selecting a second feature;
      issuing a new query against the inverted index to retrieve other data elements having the first feature, having the second feature, and not having any previously selected feature that has been used to create another sub-cluster at the level of the hierarchy; and
      creating a new sub-cluster with the other data elements having the first feature, having the second feature, and not having any previously selected feature that has been used to form another sub-cluster at the level of the hierarchy.

2. The method of claim 1, further comprising:
   in response to determining that a number of the retrieved data elements is greater than a threshold, creating the new cluster having a label of the selected feature.

3. The method of claim 1, wherein the features in the set of features comprise noun phrases of different lengths.

4. The method of claim 1, further comprising:
   in response to determining that a number of the other data elements is greater than a new threshold, creating the new sub-cluster having a label of the second feature as a child.

5. A system, comprising:
   a processor; and
   an index-based clustering system coupled to the processor and performing operations, the operations comprising:
      storing data elements, wherein each of the data elements is represented by a vector of features from a set of features;
      creating an inverted index for the set of features;
      forming a ranked list of the features in the set of features; and
      creating clusters by performing for each of the features in the ranked list of the features:
         selecting a feature in the ranked list of the features that has not been previously selected to create the clusters;
         issuing a query against the inverted index to retrieve those data elements that have the selected feature and that do not have any of the features that were previously selected to create the clusters; and
         creating a new cluster of the retrieved data elements that have the selected feature and that do not have any of the features that were previously selected to create the clusters; and
      generating a hierarchy of the clusters by:
      for a cluster at a level of the hierarchy having a first feature,
         selecting a second feature;
         issuing a new query against the inverted index to retrieve other data elements having the first feature, having the second feature, and not having any previously selected feature that has been used to create another sub-cluster at the level of the hierarchy; and
         creating a new sub-cluster with the other data elements having the first feature, having the second feature, and not having any previously selected feature that has been used to form another sub-cluster at the level of the hierarchy.

6. The system of claim 5, wherein the operations further comprise:
in response to determining that a number of the retrieved data elements is greater than a threshold, creating the new cluster having a label of the selected feature.

7. The system of claim 5, wherein the features in the set of features comprise noun phrases of different lengths.

8. The system of claim 5, wherein the operations further comprise:
in response to determining that a number of the other data elements is greater than a new threshold, creating the new sub-cluster having a label of the second feature as a child.

9. A computer program product, the computer program product comprising:
a non-transitory computer readable storage medium having computer readable program code embodied therewith, the computer readable program code, when executed by a processor of a computer, performs:
storing data elements, wherein each of the data elements is represented by a vector of features from a set of features;
creating an inverted index for the set of features;
forming a ranked list of the features in the set of features; and
creating clusters by performing for each of the features in the ranked list of the features:
selecting a feature in the ranked list of the features that has not been previously selected to create the clusters;
issuing a query against the inverted index to retrieve those data elements that have the selected feature and that do not have any of the features that were previously selected to create the clusters; and
creating a new cluster of the retrieved data elements that have the selected feature and that do not have any of the features that were previously selected to create the clusters; and
generating a hierarchy of the clusters by:
for a cluster at a level of the hierarchy having a first feature,
selecting a second feature;
issuing a new query against the inverted index to retrieve other data elements having the first feature, having the second feature, and not having any previously selected feature that has been used to create another sub-cluster at the level of the hierarchy; and
creating a new sub-cluster with the other data elements having the first feature, having the second feature, and not having any previously selected feature that has been used to form another sub-cluster at the level of the hierarchy.

10. The computer program product of claim 9, wherein the computer readable program code is configured to perform:
in response to determining that a number of the retrieved data elements is greater than a threshold, creating the new cluster having a label of the selected feature.

11. The computer program product of claim 9, wherein the features in the set of features comprise noun phrases of different lengths.

12. The computer program product of claim 9, wherein the computer readable program code is configured to perform:
in response to determining that a number of the other data elements is greater than a new threshold, creating the new sub-cluster having a label of the second feature as a child.

* * * * *